United States Patent
Nishikawa et al.

(10) Patent No.: US 7,224,317 B2
(45) Date of Patent: May 29, 2007

(54) WIRELESS COMMUNICATION DEVICE, INFORMATION-PROCESSING APPARATUS USING THE DEVICE, AND METHOD FOR ASSEMBLING THE APPARATUS

(75) Inventors: Kenji Nishikawa, Hyogo (JP); Yasuharu Matsuoka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 24 days.

(21) Appl. No.: 11/328,164

(22) Filed: Jan. 10, 2006

(65) Prior Publication Data
US 2007/0096997 A1    May 3, 2007

(30) Foreign Application Priority Data
Oct. 31, 2005    (JP)    ............................. 2005-316107

(51) Int. Cl.
*H01Q 1/24* (2006.01)
(52) U.S. Cl. ................................ 343/702; 343/700 MS
(58) Field of Classification Search ................ 343/702, 343/700 MS, 846; 455/90, 575
See application file for complete search history.

(56) References Cited

U.S. PATENT DOCUMENTS
6,501,429 B2 * 12/2002 Nakamura et al. .......... 343/702
7,170,455 B2 * 1/2007 Ozaki et al. ................ 343/702
2002/0080565 A1 * 6/2002 Teshima ..................... 361/681

FOREIGN PATENT DOCUMENTS
| JP | 8-030528 | 2/1996 |
| JP | 8-087347 | 4/1996 |
| JP | 2000-174527 | 6/2000 |

\* cited by examiner

*Primary Examiner*—Hoang V. Nguyen
(74) *Attorney, Agent, or Firm*—Wenderoth, Lind & Ponack, L.L.P.

(57) ABSTRACT

A wireless communication device is arranged to be fixed to a main body of an information-processing apparatus. The wireless communication device includes an antenna, a matching unit coupled with the antenna, a high frequency circuit coupled with the matching unit, and a case for accommodating the matching unit and the high frequency circuit. The matching unit includes a ground part having a screw acceptor capable of contacting a screw. The main body of the information-processing apparatus includes a housing made of electrically-conductive material, such as metal. A first screw contacts the screw acceptor, fixes the case to the housing of the main body, and electrically connects the ground part of the matching unit with the housing. A second screw fixes the case to the housing of the main body. This wireless communication device provides the antenna with excellent characteristics.

9 Claims, 3 Drawing Sheets

WIRELESS COMMUNICATION DEVICE, INFORMATION-PROCESSING APPARATUS USING THE DEVICE, AND METHOD FOR ASSEMBLING THE APPARATUS

FIELD OF THE INVENTION

The present invention relates to a wireless communication device, an information-processing apparatus including the device, and a method for assembling the apparatus.

BACKGROUND OF THE INVENTION

Portable information apparatuses, such as notebook personal computers, are often coupled with networks, such as the Internet, via wireless local area networks (LANs) since having their portability. The notebook personal computers are often coupled with external devices not via cable communications, such as USB or IEEE1394, but via wireless communications, such as IEEE802.11b or Blue tooth.

FIG. 3A is a perspective view of notebook personal computer 1051, a conventional information-processing apparatus. Notebook personal computer 1051 includes main body 1011 of the notebook personal computer and antennas 1013, 1031, and 1032 for wireless communications.

Antenna 1013 is a whip antenna (a vertical antenna) for a wireless communication under a standard of a digital portable phone, and enables notebook personal computer 1051 to receive the same service as internet-connecting services provided for portable phones.

Antenna 1031 is applicable to the IEEE802.11b standard, a standard of wireless LANs. Antenna 1032 is applicable to the Bluetooth, which is standardized for wireless communications with portable information devices.

FIG. 3B is a top view of antennas 1031 and 1032. Each of antennas 1031 and 1032 is made of a printed wiring board including copper foil 1033A printed on insulation body 1033B. The antennas have simple structures for receiving or sending high frequency signals with cable 1034 connected with copper foil 1033A, and mounted in main body 1011, thus often being invisible from outside.

Antenna 1013 for a portable phone can be accommodated in personal computer 1051, while the antenna is visible from the outside of personal computer 1051 similarly to general portable phones.

As shown in FIG. 3A, antenna 1013, antenna 1031, and a high frequency circuit connected to them are arranged over display 1055 of main body 1011 for preventing human bodies from influences of the device emitting electromagnetic waves. The antennas are arranged for allowing notebook personal computer 1051 to be used not only on a desk but also on a lap. Antenna 1032 treats electromagnetic waves weaker than electromagnetic waves for a portable phone and a wireless LAN, and is accordingly arranged at an end of main body 1011.

In regard to devices emitting electromagnetic waves to human bodies, according to the growth of the market of portable phones, a standard of electromagnetic waves permissible for human bodies has been determined as a specific absorption rate (SAR).

The IEEE802.11b standard is a standard of a wireless LAN which performs wireless communications at about 11 Mbps in a 2.4 GHz band. The Bluetooth, a standard of wireless communications for portable information devices, enables communication at 1 Mbps with radio waves in a 2.45 GHz band. Both of them are communication standards certified world-wide.

Global System for Mobile Communications (GSM) of portable phones including GSM 900 using a 900 MHz band in Europe and Asia, GSM 1800 using a 1800 MHz band in Germany, the UK, France, Hong Kong, Singapore, and Taiwan, and GSM 1900 using a 1900 MHz band in the U.S., Canada, and Hawaii is well known. The GPRS system, which has a communication speed of maximum 115 kbps using a portable phone network of the GSM, is also known.

The EDGE system, a system based on the GSM system and a technology succeeding the GPRS system, is known besides the GSM system and the GPRS system. Furthermore, new standards, such as CDMA, have been developed.

Accordingly, antenna 1013 and the high frequency circuit corresponding to each of the portable phone standards are preferably unitarily packaged and are selected by manufacturers based on respective specifications or destinations of notebook personal computers.

However, there are some problems for antenna 1013 and the high frequency circuit packaged and mounted separately from main body 1011 mechanically, electrically, and thermally. In the portable phone standard which requires predetermined receiving characteristics in wide ranges, antenna 1013 is required to have a high efficiency for taking weak radio waves into the high frequency circuit efficiently. Main body 1011 itself may block radio waves depending upon the arrangement of antenna 1013 or the process of mounting a package. Besides, a performance of antenna 1013 may deteriorate if a case of main body 1011 is close to antenna 1013 or if an environmental obstacle, such as a body of a user, is close to antenna 1013.

In addition, the high frequency circuit is often implemented by integrated circuits having high powers and operating at high frequencies, thus generating a lot of heat. The packaged high frequency circuit is isolated from main body 1011 thermally, hence confining the heat to the package. Accordingly, it is necessary that the package itself dissipates the heat, or the package transfers the heat to main body 1011 to dissipate the heat.

SUMMARY OF THE INVENTION

A wireless communication device is arranged to be fixed to a main body of an information-processing apparatus. The wireless communication device includes an antenna, a matching unit coupled with the antenna, a high frequency circuit coupled with the matching unit, and a case for accommodating the matching unit and the high frequency circuit. The matching unit includes a ground part having a screw acceptor capable of contacting a screw. The main body of the information-processing apparatus includes a housing made of electrically-conductive material, such as metal. A first screw contacts the screw acceptor, fixes the case to the housing of the main body, and causes the ground part of the matching unit to be electrically connected with the housing. A second screw fixes the case to the housing of the main body.

This wireless communication device provides the antenna with excellent characteristics.

DETAILED DESCRIPTION OF THE PREFERRED EMBODIMENT

Figure 1A:
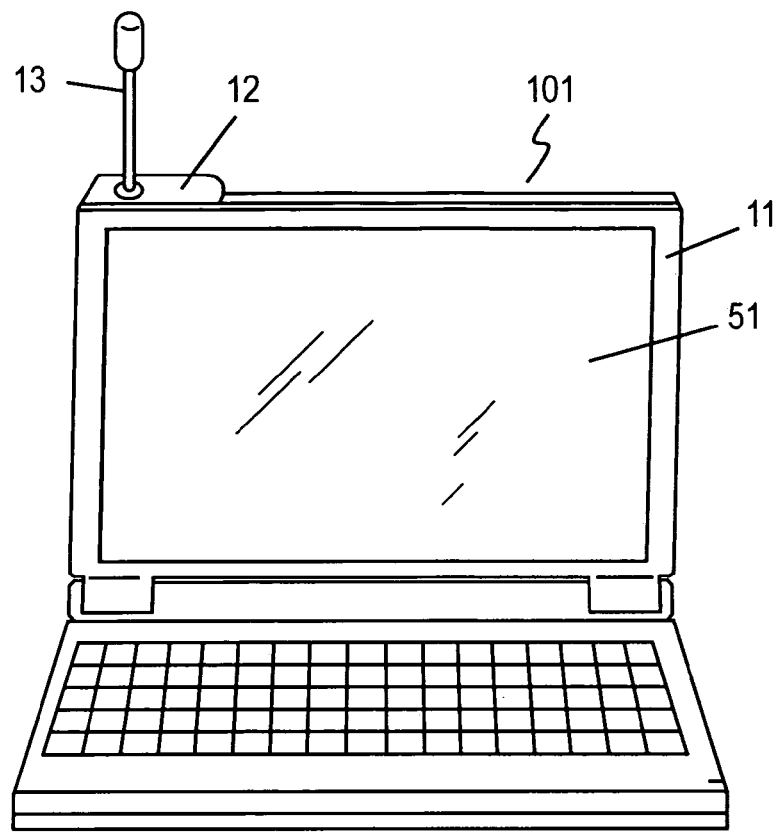
FIGS. 1A and 1B are a schematic front view and a schematic rear view of an information-processing apparatus in accordance with an exemplary embodiment of the present invention, respectively.
Figure 1B:
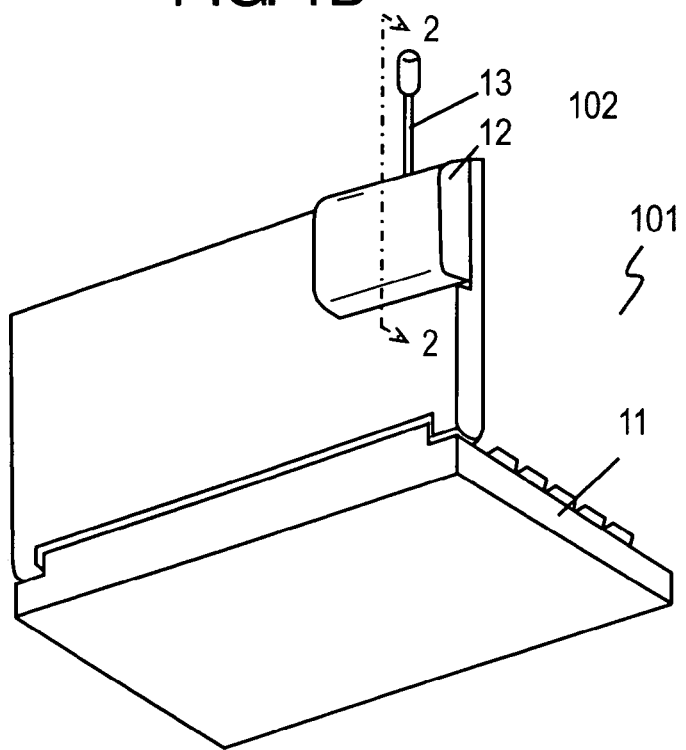
Figure 2:
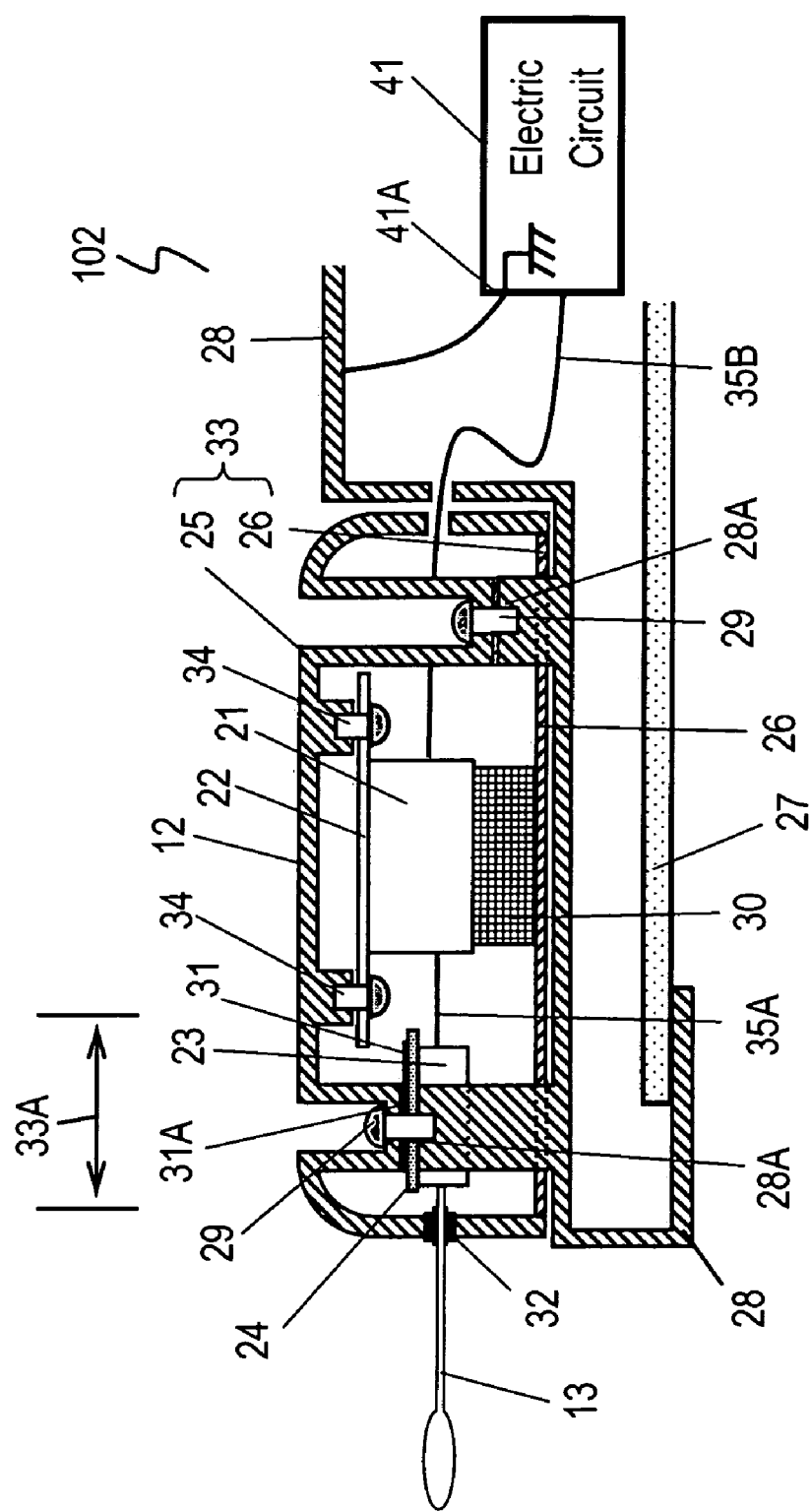
FIG. 2 is a sectional view of the information-processing apparatus at line 2-2 shown in FIG. 1B.
Figure 3A:
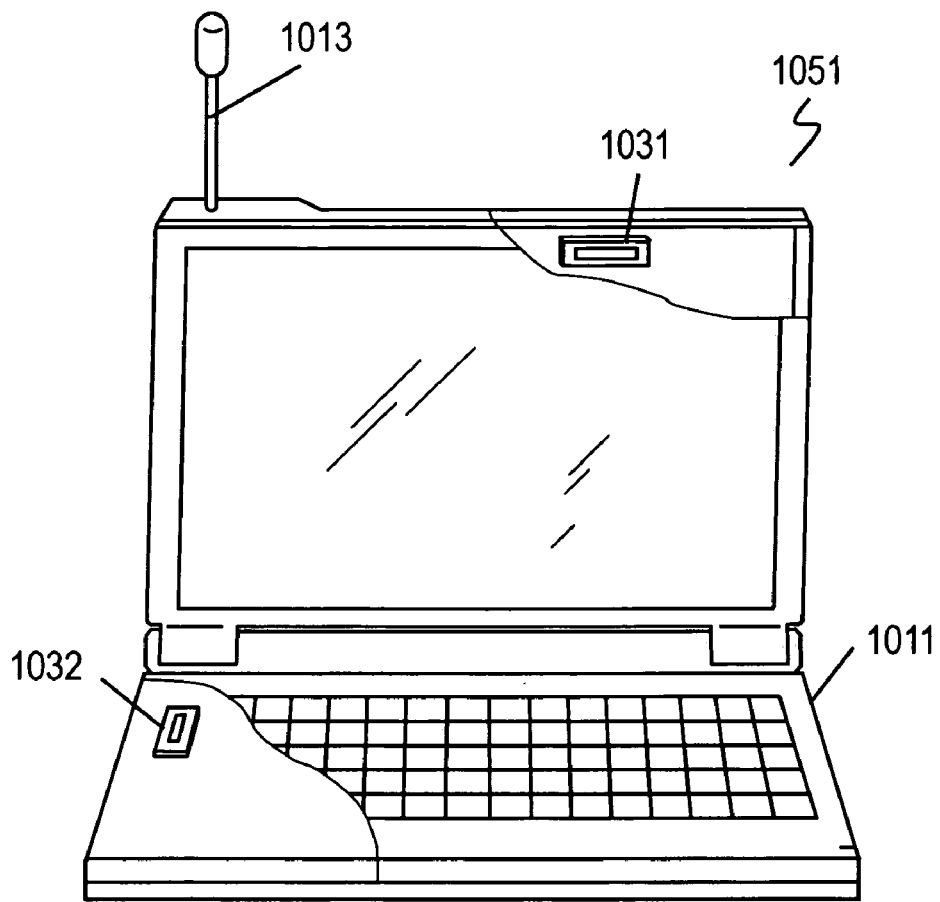
FIG. 3A is a perspective view of a conventional information-processing apparatus.
Figure 3B:
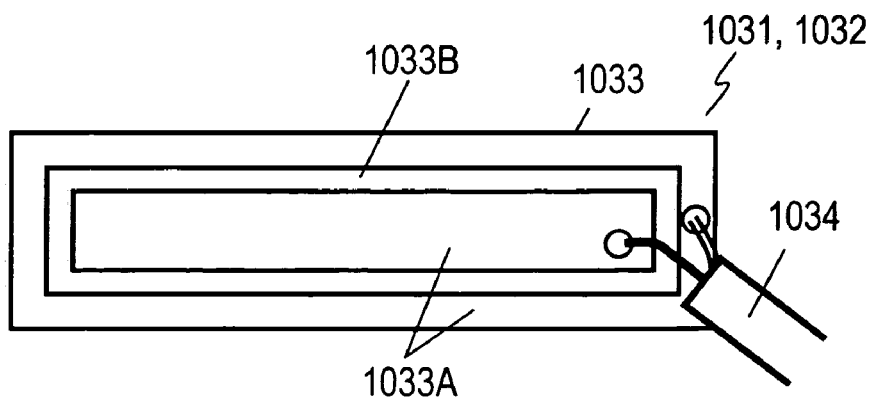
FIG. 3B is a top view of a conventional antenna.

FIGS. 1A and 1B are a schematic front view and a schematic rear view of notebook personal computer 101, an information-processing apparatus, in accordance with an exemplary embodiment of the present invention, respectively. FIG. 2 is a sectional view of notebook personal computer 101 at line 2-2 shown in FIG. 1B.

As shown in FIGS. 1A and 1B, notebook personal computer 101, the information-processing apparatus of the embodiment, includes wireless communication device 102 and main body 11 of the notebook personal computer having display 51. Wireless communication device 102 includes wireless pack 12 and extensible whip antenna (vertical antenna) 13.

As shown in FIG. 2, wireless pack 12 includes high frequency circuit 21, circuit board 22 having high frequency circuit 21 mounted thereto, matching unit 23 coupled with antenna 13, and circuit board 24 having matching unit 23 mounted thereto. Circuit boards 22 and 24 are accommodated in case 33 formed of upper case 25 and lower case 26. Circuit board 22 is fixed to upper case 25 with screw 34. High frequency circuit 21 modulates signals with digital signals to provide high frequency signals, and sends the high frequency signals from antenna 13, or demodulates high frequency signals received at antenna 13 into digital signals. Signal wire 35A couples circuit board 24 (matching unit 23) with circuit board 22 (high frequency circuit 21). Matching unit 23 performs impedance-matching between antenna 13 and high frequency circuit 21. Display 51 includes liquid crystal display (LCD) element 27 and housing 28 accommodating LCD element 27. Housing 28 is made of lightweight metal, such as magnesium or aluminum alloy. Plural screws 29 made of electrically-conductive metal fix wireless pack 12 detachably to main body 11. Holes 28A are formed an tapped in housing 28 for accepting screws 29 inserted into the holes, respectively. Insulator 30 is a thermally-conductive member made of rubber having a large thermal conductivity and a large electrical insulating property. Housing 28 is made of lightweight metal, such as magnesium or aluminum alloy. Upper case 25 and lower case 26 are made of material identical to that of housing 28. Signal wire 35B couples circuit board 22 (high frequency circuit 21) with electric circuit 41 in main body 11.

Wireless pack 12 processes high frequency signals of a portable phone standard. As described above, the portable phone standard has a specification, such as a frequency band, which is different depending on its destination. Wireless pack 12 is designed to be detachable to main body 11 with screw 29. In FIG. 2, the number of screws 29 is two, however, may preferably be more than two.

As shown in FIG. 2, circuit board 24 has ground part 31 of matching unit 23. Ground part 31 has screw acceptor 31A capable of contacting a screw. Electrically-conductive screw 29 contacts screw acceptor 31A of ground part 31, and allows ground part 31 to be electrically connected to housing 28 of main body 11. Housing 28 is connected with ground terminal 41A of electric circuit 41 of main body 11. That is, screw 29 fixes wireless pack 12 to main body 11 detachably and mechanically, and further, allows ground part 31 of matching unit 23 to be electrically connected with housing 28 connected with ground terminal 41A of electric circuit 41 in main body 11. This structure can ground antenna 13 electrically stably, thereby providing the antenna with excellent characteristics, particularly with excellent receiving characteristics of radio waves.

Whip antenna 13 is a grounded-type ¼-wavelength vertical antenna. The grounded-type ¼-wavelength vertical antenna is provided by having an element having ¼ of a wavelength stand on the earth, by connecting a core wire of a coaxial cable with the element, and by connecting a braided wire surrounding the core wire of the coaxial cable with the earth. The earth is an electrical conductor, and a surface of the earth thus functions electromagnetically as a mirror which virtually provides another vertical antenna beneath the earth. This arrangement allows the ¼-wavelength vertical antenna to operate as a dipole antenna. If the element of the antenna stands vertically on an electrically-conductive board, this conductive board functions identically to the earth. According to the present embodiment, housing 28 of main body 11, upper case 25, and lower case 26 of the wireless pack which are made of metal provide a surface having a potential identical to that of the earth, and function identically to the earth, thus improving characteristics of antenna 13.

High frequency circuit 21 is often implemented by integrated circuits operating at high frequencies, thereby generating a lot of heat. This heat is transmitted to lower case 26 through circuit board 22 and heat-dissipating rubber 30, and is then transmitted to housing 28 of the notebook personal computer as to dissipate the heat from high frequency circuit 21. Housing 28 is made of metal, thus having a large heat dissipating property. Similarly to heat-dissipating rubber 30, lower case 26 is made of material, such as metal sheet material, having a large thermal conductivity as to transfer the heat to housing 28

Circuit board 24 having matching unit 23 mounted thereto is preferably placed at end area 33A in case 33 of wireless pack 12. Upper case 25 and lower case 26, being made of electrically-conductive material, such as metal, may cause impedance characteristics of antenna 13 to vary notably. This variation can be eliminated as much as possible by the placing of circuit board 24 at end area 33A in case 33. In addition, if case 33 is made of electrically-conductive material, insulator 32 provided at a position of case 25 where antenna 13 is placed insolates antenna 13 electrically from case 25. Furthermore, antenna 13 and case 25 are separated each other by a distance sufficient for preventing influence to transmitting/receiving characteristics of radio waves.

A method for assembling notebook personal computer 101 of the present embodiment will be described below. Wireless pack 12 is designed to be detachable to main body 11 with screw 29. First, plural wireless packs 12 are prepared corresponding to respective portable phone standards having respective specifications and destinations. Then, one wireless pack 12 is selected from the plural wireless packs 12 based on a predetermined specification and a predetermined destination. The selected wireless pack 12 is fixed to main body 11 with screw 29. This method allows notebook personal computers 101 to be manufactured flexibly depending on predetermined specifications and destinations.

Furthermore, screw 29 fixes wireless pack 12 detachably to main body 11, and further, causes ground part 31 of matching unit 23 to be electrically connected securely with housing 28 of main body 11. This structure electrically stabilizes a ground of antenna 13, thereby improving characteristics, particularly receiving-characteristics of radio waves.

As long as antenna 13 and case 33 are electrically insulated from each other, a metallic member having a large thermal conductivity may be used instead of heat-dissipating rubber 30.

In addition, rust-resistance metal, such as brass, stainless steel, or iron plated with nickel, having a small resistance, may be preferably used as the material of screw 29.

The metal housing which functions as the earth and is perpendicular to antenna 13 preferably has a large area. As far as structures and designs permit, antenna 13 is located preferably near the center of a large portion of a plane surface, such as a back surface of housing 28 of display 51, and perpendicularly to the plane surface.

What is claimed is:

1. A wireless communication device arranged to be fixed to a main body of an information-processing apparatus, said wireless communication device comprising:
    an antenna;
    a matching unit coupled with the antenna, the matching unit including a ground part having a screw acceptor capable of contacting a screw;
    a high frequency circuit coupled with the matching unit; and
    a case for accommodating the matching unit and the high frequency circuit,
    wherein the main body of the information-processing apparatus includes a electrically-conductive housing,
    wherein a first screw contacts the screw acceptor, fixes the case to the housing of the main body, and electrically connects the ground part of the matching unit with the housing, and
    wherein a second screw fixes the case to the housing of the main body.

2. The wireless communication device of claim 1, further comprising a thermally-conductive member for coupling the high frequency circuit thermally with the case.

3. The wireless communication device of claim 1, wherein the matching unit is placed at an end area in the case.

4. The wireless communication device of claim 1, wherein said wireless communication device is selected from a plurality of wireless communication devices having specifications different from each other.

5. An information-processing apparatus comprising:
    a main body including an electrically-conductive housing;
    a wireless communication device including
        an antenna,
        a matching unit coupled with the antenna, the matching unit including a ground part having a screw acceptor capable of contacting a screw,
        a high frequency circuit coupled with the matching unit, and
        a case for accommodating the matching unit and the high frequency circuit;
    a first screw for fixing the wireless communication device to the housing of the main body by contacting the screw acceptor, the first screw electrically connecting the ground part of the matching unit with the housing; and
    a second screw for fixing the wireless communication device to the housing of the main body.

6. The information-processing apparatus of claim 5, wherein the wireless communication device further includes a thermally-conductive member for coupling the high frequency circuit with the case thermally.

7. The information-processing apparatus of claim 5, wherein the matching unit is placed at an end area in the case.

8. The information-processing apparatus of claim 5, wherein the wireless communication device is selected from a plurality of wireless communication devices having specifications different from each other.

9. A method for assembling an information-processing apparatus, comprising:
    selecting a wireless communication device from a plurality of wireless communication devices having specifications different from each other, each of the wireless communication devices including
        an antenna,
        a matching unit coupled with the antenna, the matching unit including a ground part having a screw acceptor capable of contacting a screw,
        a high frequency circuit coupled with the matching unit, and
        a case for accommodating the matching unit and the high frequency circuit;
    fixing the case of the selected wireless communication device to a housing of a main body with the first screw by allowing a first screw to contact the screw acceptor of the ground part of the matching unit of the selected wireless communication device as to allow the first screw to electrically connect the ground part of the matching unit of the selected wireless communication device with the housing; and
    fixing the case of the selected wireless communication device to the housing of the main body with a second screw.

* * * * *